(12) United States Patent
Adachi

(10) Patent No.: US 9,237,487 B2
(45) Date of Patent: *Jan. 12, 2016

(54) COMMUNICATION CONTROL METHOD AND HOME BASE STATION

(75) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/129,891

(22) PCT Filed: Jun. 28, 2011

(86) PCT No.: PCT/JP2011/064840
§ 371 (c)(1),
(2), (4) Date: Dec. 27, 2013

(87) PCT Pub. No.: WO2013/001612
PCT Pub. Date: Jan. 3, 2013

(65) Prior Publication Data
US 2014/0128076 A1 May 8, 2014

(51) Int. Cl.
| H04W 36/00 | (2009.01) |
| H04W 36/08 | (2009.01) |
| H04W 80/04 | (2009.01) |
| H04W 84/04 | (2009.01) |
| H04W 84/12 | (2009.01) |

(52) U.S. Cl.
CPC ...... *H04W 36/0022* (2013.01); *H04W 36/0016* (2013.01); *H04W 36/08* (2013.01); *H04W 80/04* (2013.01); *H04W 84/045* (2013.01); *H04W 84/12* (2013.01)

(58) Field of Classification Search
CPC ............ H04W 36/0016; H04W 36/0022; H04W 36/08; H04W 76/00; H04W 80/04; H04W 84/045; H04W 84/12

USPC ................... 455/436, 444, 456.1, 550.1, 561; 370/328, 331, 338
See application file for complete search history.

(56) References Cited

U.S. PATENT DOCUMENTS

| 2010/0272013 A1* | 10/2010 | Horn et al. ................... 370/328 |
| 2012/0196600 A1 | 8/2012 | Mizukoshi |
| 2013/0089076 A1* | 4/2013 | Olvera-Hernandez et al. .............................. 370/332 |

(Continued)

FOREIGN PATENT DOCUMENTS

| WO | 2011/026407 A1 | 3/2011 |
| WO | 2011/045882 A1 | 4/2011 |

OTHER PUBLICATIONS

International Search Report; PCT/JP2011/064840; Aug. 9, 2011.

(Continued)

*Primary Examiner* — Babar Sarwar
(74) *Attorney, Agent, or Firm* — Studebaker & Brackett PC

(57) ABSTRACT

A home base station (HeNB) that supports LIPA (Local Internet Protocol Access) defined in the 3GPP (3rd Generation Partnership Project) standards: transmits (step S103) information indicating that a user terminal has an LIPA connection in a handover request, to a target base station, by including the information in the handover request, when a handover procedure from the home base station to the target base station is started for the user terminal having the LIPA connection; and continues (steps S106, S107) the handover procedure without releasing the LIPA connection when the target base station permits the handover request.

4 Claims, 6 Drawing Sheets

(56) References Cited

U.S. PATENT DOCUMENTS

2013/0301610 A1* 11/2013 Ali et al. ............... 370/331
2013/0308527 A1* 11/2013 Chin et al. ............. 370/328

OTHER PUBLICATIONS

3GPP TS 22.220 V9.6.0 (Mar. 2011), 3rd Generation Partnership Project; Technical Specification Group Services and System Aspects; Service requirements for Home Node B (HNB) and Home eNode B (HeNB) (Release 9), pp. 1-22.

3GPP TS 23.401 V10.3.0 (Mar. 2011), 3rd Generation Partnership Project; Technical Specification Group Services and System Aspects; General Packet Radio Service (GPRS) enhancements for Evolved Universal Terrestrial Radio Access Network (E-UTRAN) access (Release 10); pp. 1-278.

3GPP TR 23.829 V10.0.0 (Mar. 2011), 3rd Generation Partnership Project; Technical Specification Group Services and System Aspects; Local IP Access and Selected IP Traffic Offload (LIPA-SIPTO) (Release 10), pp. 1-43.

3GPP TS 36.300 V10.3.0 (Mar. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), pp. 1-197.

An Office Action; "Notice of Reasons for Rejection," issued by the Japanese Patent Office on Aug. 26, 2014, which corresponds to Japanese Patent Application No. 2013-522396 and is related to U.S. Appl. No. 14/129,891; with English language statement of relevance.

Huawei et al.; "Discovery of the LIPA mobility area"; 3GPP TSG SA WG2 Meeting #85; May 16-20, 2011; pp. 1-4; TD S2-112828 (revision of S2-112783); Xi'an, China.

An Office Action issued by the Korean Patent Office on Feb. 10, 2015, which corresponds to Korean Patent Application No. 10-2013-7034200 and is related to U.S. Appl. No. 14/129,891; with English language concise explanation.

Catt; "Discussion of LGW Deployment in Local Network"; 3GPP TSG SA WG2 Meeting #84; TD S2-111814; Apr. 11-15, 2011; pp. 1-3; Bratislava, Slovakia.

The extended European search report issued by the European Patent Office on Apr. 14, 2015, which corresponds to European Patent Application No. 11868448.9-1854 and is related to U.S. Appl. No. 14/129,891.

Communication pursuant to Rules 70(2) and 70a(2) EPC issued by the European Patent Office on May 6, 2015, which corresponds to European Patent Application No. 11868448.9-1854 and is related to U.S. Appl. No. 14/129,891.

ZTE; "LIPA mobility based on direct X2/Iurh"; 3GPP Draft; SA WG2 Meeting #85; S2-112321 (revision of S2-111349); May 16-20, 2011; pp. 1-2; Xi'An, P.R. China.

* cited by examiner

COMMUNICATION CONTROL METHOD AND HOME BASE STATION

TECHNICAL FIELD

The present invention relates to a communication control method and a home base station in a mobile communication system.

BACKGROUND ART

In 3GPP (3rd Generation Partnership Project) which is a project aiming to standardize a mobile communication system, the standardization of LTE Advanced, which is a sophisticated version of LTE (Long Term Evolution), is conducted after 3GPP Release 10.

In the 3GPP Release 10, an LIPA (Local Internet Protocol Access) function by a home base station is defined (see NPLs 1 and 2). The home base station is a small-sized base station provided in a house or in a company and may be called a femto cell base station.

LIPA is a function of performing communication by an LIPA connection (LIPA PDN connection) which is established between a user terminal and a local device within an IP network of the house (or company) where the user terminal is located, via a home base station and not via a core network of an operator. The LIPA does not feed user data to the core network, and thus, it is possible to reduce a traffic load of the core network.

The 3GPP Release 10 does not support a mobility of the LIPA connection. Therefore, when a user terminal having the LIPA connection moves from a home base station to another base station, the connection is always released. As a result, when resuming communication between the user terminal and the local device to which the user terminal had been connected, a reconnection process is needed, and thus, the communication is interrupted.

CITATION LIST

Non Patent Literature

[NPL 1] 3GPP Technical Specification TS 23.401 V10.3.0, "4.3.16 Local IP Access (LIPA) function"
[NPL 2] 3GPP Technical Specification TS 36.300 V10.3.0, "4.6.5 Support of LIPA with HeNB"

SUMMARY OF THE INVENTION

Release 11, of which the specification will be developed in the future following the 3GPP Release 10, is expected to support the mobility of the LIPA connection between the home base stations that support the LIPA, that is, enable handover while maintaining the LIPA connection.

However, the current specification defines that when the user terminal having the LIPA connection moves from the home base station to another base station, the LIPA connection is always released, and thus, there is a problem that it is not possible to support the mobility of the LIPA connection.

Therefore, it is an object of the present invention to provide a communication control method capable of supporting a mobility of an LIPA connection and to provide a home base station thereof.

The first feature of a communication control method according to the present invention is summarized as follows. A communication control method in a home base station (source HeNB 200-1) that supports LIPA (Local Internet Protocol Access) defined in the 3GPP (3rd Generation Partnership Project) standards, comprises: a step (step S103) of transmitting information indicating that a user terminal (UE 100) has an LIPA connection in a handover request, to a target base station, by including the information in the handover request, when a handover procedure from the home base station to the target base station is started for the user terminal having the LIPA connection; and a step (steps S106, 107) of continuing the handover procedure without releasing the LIPA connection when the target base station permits the handover request.

The first feature of a home base station according to the present invention is summarized as follows. A home base station (source HeNB 200-1) that supports LIPA (Local Internet Protocol Access) defined in the 3GPP (3rd Generation Partnership Project) standards, is configured to: transmit information indicating that a user terminal (UE 100) has an LIPA connection, to the target base station, by including the information in a handover request, when a handover procedure from the home base station to the target base station is started for the user terminal having the LIPA connection; and continue the handover procedure without releasing the LIPA connection when the target base station permits the handover request.

The second feature of a communication control method according to the present invention is summarized as follows. A communication control method in a home base station (target HeNB 200-2), comprises: a step (step S103) of receiving a handover request transmitted from another home base station that supports LIPA (Local Internet Protocol Access) defined in the 3GPP (3rd Generation Partnership Project) standards, the handover request including information indicating that a user terminal (UE 100) has an LIPA connection; and a step (step S105) of permitting the handover request from the another home base station when the home base station supports the LIPA.

The second feature of a c home base station according to the present invention is summarized as follows. A home base station (target HeNB 200-2) is configured to: receive a handover request transmitted from another home base station (source HeNB 200-1) that supports LIPA (Local Internet Protocol Access) defined in the 3GPP (3rd Generation Partnership Project) standards, the handover request including information indicating that a user terminal (UE 100) has an LIPA connection; and permit the handover request from the another home base station when the home base station supports the LIPA.

DESCRIPTION OF THE EMBODIMENT

Figure 1:
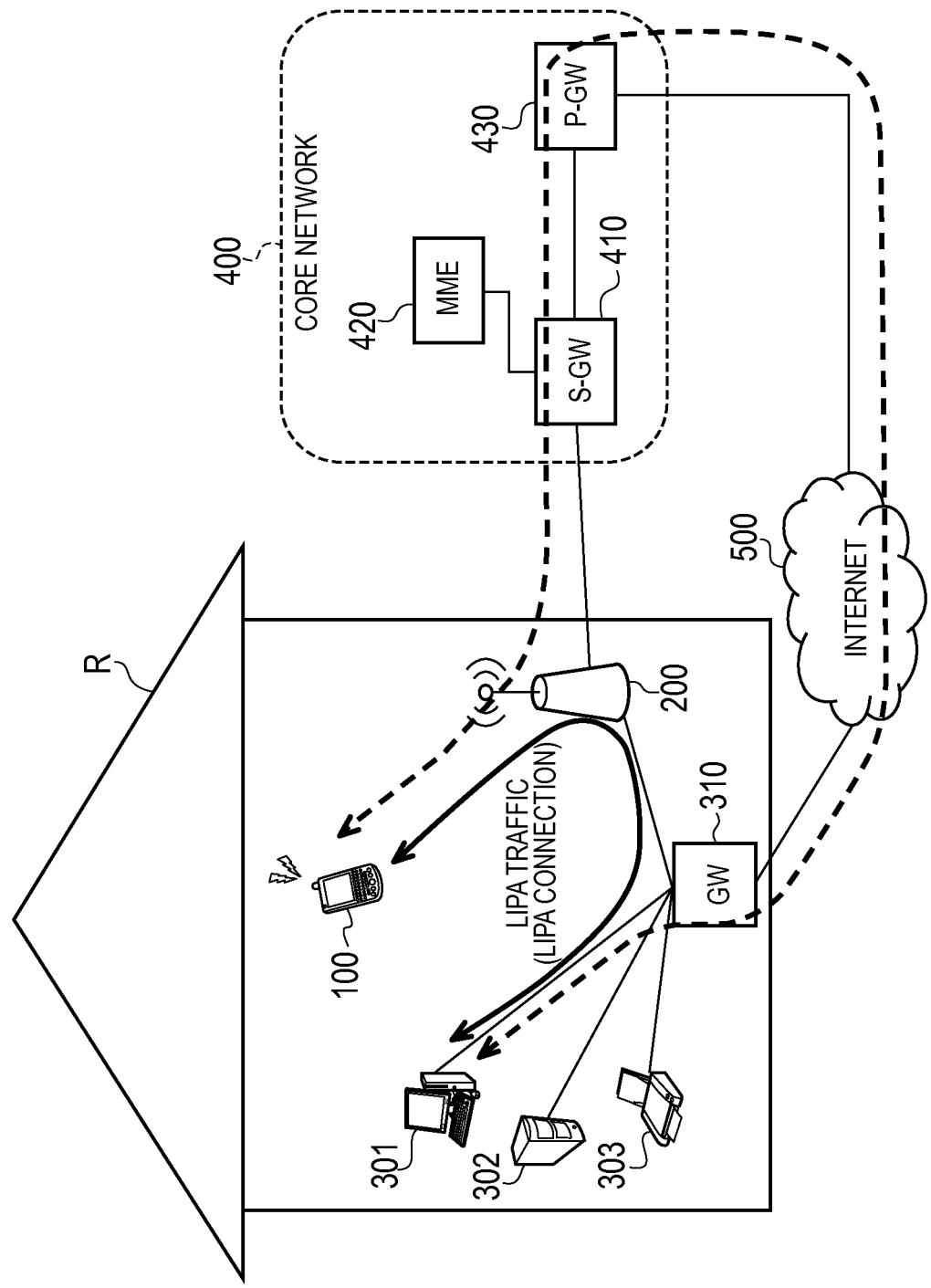
FIG. 1 is a diagram showing an entire configuration of a mobile communication system according to the embodiment of the present invention.

With reference to the drawings, the embodiment of the present invention will be described. In the drawings of the following embodiments, the same or similar reference signs are applied to the same or similar portions.

(Configuration of Mobile Communication System)

FIG. 1 is a diagram showing an entire configuration of a mobile communication system according to the present embodiment. The mobile communication system according to the present embodiment is configured on the basis of LTE-Advanced (after 3GPP Release 10) of which the specification is developed in 3GPP.

As shown in FIG. 1, the mobile communication system according to the present embodiment includes a home base station (Home evolved Node B: HeNB) 200, a user terminal (User Equipment: UE) 100, local devices (Local Entities: LEs) 301 to 303, and a gateway (GW) 310. In the present embodiment, each of the HeNB 200, the UE 100, the LEs 301 to 303, and the GW 310 is located on an IP network in the same house R.

The HeNB 200 forms a small-sized cell, and performs radio communication with the UE 100 located within the cell. The cell is a minimum unit of a radio communication area.

In the HeNB 200, a function of a local gateway (L-GW) for implementing LIPA is provided. The LIPA is a function that enables the IP-compatible UE 100 connected via the HeNB 200 to access another IP-compatible entity within an IP network of the same house/company without a user plane crossing an operator network (core network 400) other than an HeNB subsystem.

The HeNB 200 (more particularly, L-GW provided in the HeNB 200) establishes or releases the LIPA connection. A solid arrow in FIG. 1 represents user data transmitted via the LIPA connection between the UE 100 and the LE 301. Whereas, a dotted arrow in FIG. 1 represents user data transmitted via the core network 400 when the LIPA is not implemented. When the LIPA is implemented, the user data will be transmitted not via the core network 400, and thus, it is possible to reduce a traffic load of the core network 400.

The UE 100 is a portable radio communication device carried by a user, and is configured to be capable of IP communication. In the present embodiment, the UE 100 includes an LIPA connection via the HeNB 200, between with the LE 301. The UE 100 communicates with the LE 301 by using the LIPA connection.

Each of the LEs 301 to 303 is a device capable of IP communication. In the present embodiment, the LE 301 is a PC (Personal Computer), the LE 302 is a server, and the LE 303 is a printer.

The GW 310 relays data transmitted and received within the IP network in the house R, and performs a protocol conversion between the IP Network within the house R and an Internet 500.

The core network 400 includes a serving gateway (S-GW) 410, a mobility management entity (MME) 420, and a PDN gateway (P-GW) 430.

The S-GW 410 is provided to correspond to a user plane, and is configured to perform transfer control on the user data.

The MME 420 is provided to correspond to a control plane, and is configured to perform various types of mobility managements on the UE 100.

A transmission path between the HeNB 200 and the S-GW 410/MME 420 is called an S1 interface. It is noted that an inter-base station transmission path between the HeNB 200 and another HeNB is called an X2 interface.

The P-GW 430 functions as an entrance from the core network 400 to the Internet 500, and an exit from the Internet 500 to the core network 400.

It is noted that although not shown in FIG. 1, an HeNB gateway (HeNB GW) that houses a plurality of HeNBs 200 may be provided between the HeNB 200 and the S-GW 410/MME 420.

(Configuration of UE)

Figure 2:
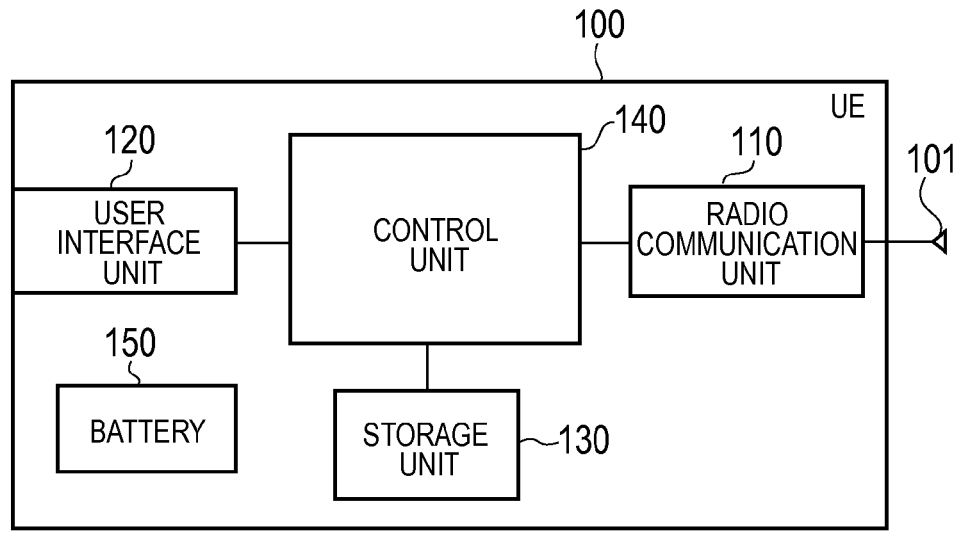
FIG. 2 is a block diagram of the user equipment according to the embodiment of the present invention.

Next, the configuration of the UE 100 according to the present embodiment will be described. FIG. 2 is a block diagram of the UE 100.

As shown in FIG. 2, the UE 100 includes an antenna 101, a radio communication unit 110, a user interface unit 120, a storage unit 130, a control unit 140, and a battery 150.

The radio communication unit 110 is configured to perform radio communication via the antenna 101. For transmission, the radio communication unit 110 performs up-conversion, amplification, etc., on a baseband signal input from the control unit 140, and outputs a radio signal from the antenna 101. For reception, the radio communication unit 110 performs amplification, down-conversion, etc. on a received signal input from the antenna 101, and then outputs a baseband signal to the control unit 140.

The user interface unit 120 includes a microphone to which voice is input, a speaker that outputs voice, a display that displays an image, and a button pressed by a user, for example.

The storage unit 130 is configured by using a memory, for example, and stores various types of information used for control, for example, by the control unit 140.

The control unit 140 is configured by using a CPU, for example, and controls various types of functions provided in the UE 100.

The battery 150 stores power to be supplied to each block of the UE 100.

In the UE 100 thus configured, when the control unit 140 is in a state of being executing communication (called a connected mode), the control unit 140 measures a reception state (reference signal received power or reference signal received quality) of a reference signal received by the radio communication unit 110 for each cell, and controls so that a measurement result for each cell is reported to the serving base station.

Such a report is called measurement report. The serving base station decides whether to perform handover of the UE 100 on the basis of the measurement report. The handover is an operation that the UE 100 in a connected mode switches the serving cells. It is noted that the measurement report has two settings, i.e., a setting (Periodic) that is periodically transmitted and a setting (Event trigger) that is not transmitted until a trigger condition for permitting handover is satisfied.

(Configuration of HeNB)

Figure 3:
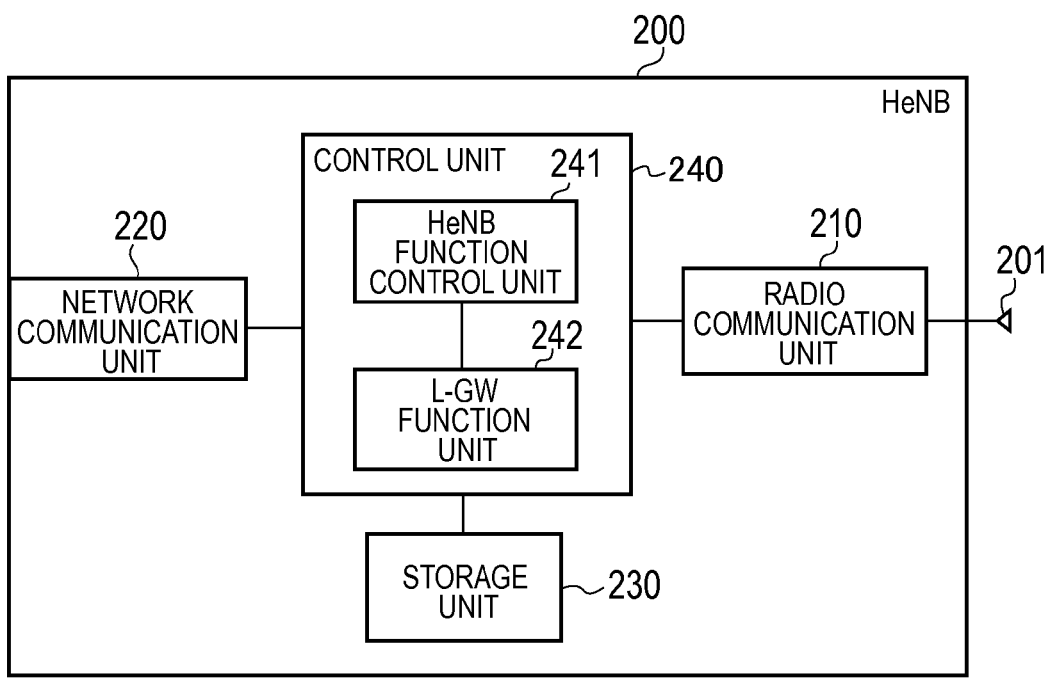
FIG. 3 is a block diagram of the home base station according to the embodiment of the present invention.

Next, the configuration of the HeNB 200 according to the present embodiment will be described. FIG. 3 is a block diagram of the HeNB 200.

As illustrated in FIG. 3, the HeNB 200 includes an antenna 201, a radio communication unit 210, a network communication unit 220, a storage unit 230, and a control unit 240.

The radio communication unit 210 is configured to perform radio communication through the antenna 201. For transmission, the radio communication unit 210, performs up-conversion, amplification, etc., on a baseband signal input from the control unit 240, and outputs a radio signal from the antenna 201. For reception, the radio communication unit 210 performs, amplification, down-conversion, etc., on a received signal input from the antenna 201, and then outputs a baseband signal to the control unit 240.

The network communication unit 220 uses the S1 interface to communicate with the S-GW 410, the MME 420, or the HeNB GW. Furthermore, the network communication unit 220 performs communication (inter-base station communication) with another HeNB by using the X2 interface. Further, the network communication unit 220 communicates with the LEs 301 to 303 via the GW 310 in the house R.

The storage unit 230 is configured by using a memory, for example, and stores various types of information used for control, for example, by the control unit 240.

The control unit 240 is configured by using a CPU, for example, and controls various functions provided in the HeNB 200. The control unit 240 includes an HeNB function control unit 241 for controlling an original function of the HeNB and an L-GW function unit 242 for implementing the function of the L-GW. It is noted that when the LIPA is not supported, the HeNB 200 does not include the L-GW function unit 242.

The HeNB function control unit 241 controls radio communication with the UE 100 and controls network communication using the S1 interface and the X2 interface. Further, the HeNB function control unit 241 decides whether to perform handover of the UE 100 to a target base station on the basis of the measurement report received by the radio communication unit 210 from the UE 100. The HeNB function control unit 241 starts a handover procedure when it is decided to perform handover. It is noted that the handover procedure includes a handover preparation stage, a handover execution state, and a handover completion stage.

The L-GW function unit 242 performs various types of controls for implementing the LIPA, for example, establishes or releases the LIPA connection. As described later, the L-GW function unit 242 is controlled by Intra-node Signaling from the HeNB function control unit 241.

In the HeNB 200 thus configured, the HeNB function control unit 241 controls the network communication unit 220 to transmit information indicating that the UE 100 has the LIPA connection, to the target base station, by including the information in a handover request, when starting a handover procedure of the UE 100 having the LIPA connection from the HeNB 200 (self station) to the target base station. Then, the HeNB function control unit 241 continues the handover procedure without releasing the LIPA connection, when the target base station permits the handover request. In contrast, when the target base station rejects the handover request, the HeNB function control unit 241 requests the L-GW function unit 242 to release the LIPA connection by using Intra-node Signaling.

On the other hand, when the HeNB 200 is to receive the handover request, the network communication unit 220 receives the handover request including information indicating that the UE 100 has the LIPA connection. The HeNB function control unit 241 confirms whether or not the HeNB 200 (self station) supports the LIPA (that is, whether or not the L-GW function unit 242 is provided) and permits the handover request received by the network communication unit 220 when the LIPA is supported. In particular, the network communication unit 220 is controlled to return an acknowledgement to the handover request received by the network communication unit 220.

(Operation of Mobile Communication System)

Next, by using FIG. 4 to FIG. 6, the operation of the mobile communication system according to the present embodiment will be described.

Figure 4:
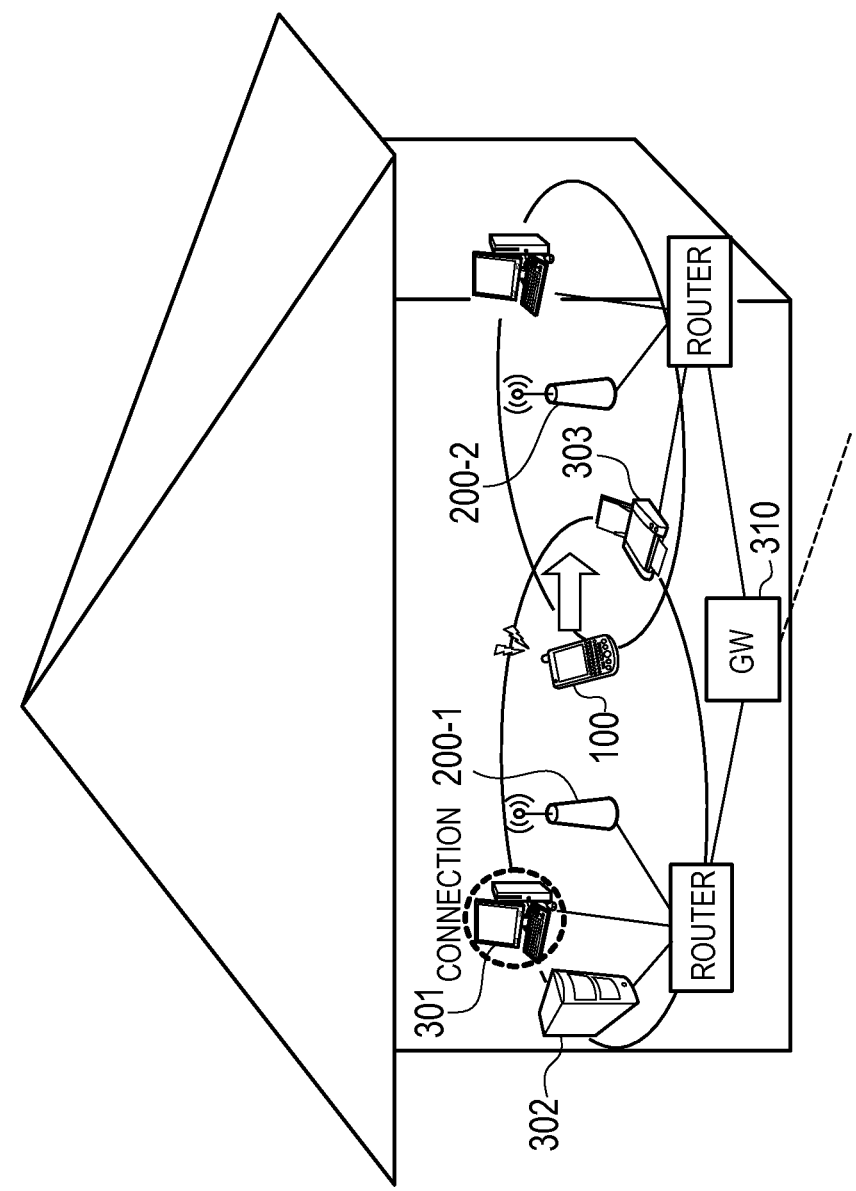
FIG. 4 is a diagram for describing operation of the home base station according to the embodiment of the present invention.

As shown in FIG. 4, the UE 100 positioned in the communication area of HeNB 200-1 moves in the communication area of HeNB 200-2 while establishing the LIPA connection with the LE 301 via the HeNB 200-1.

An operation pattern 1 described later is an operation of the mobile communication system when the HeNB 200-1 that supports the LIPA is a source (handover source) and the HeNB 200-2 that supports the LIPA is a target (handover target).

In contrast, an operation pattern 2 described later is an operation of the mobile communication system when the HeNB 200-1 that supports the LIPA is a source and the HeNB 200-2 that does not support the LIPA is a target.

(1) Operation Pattern 1

Figure 5:
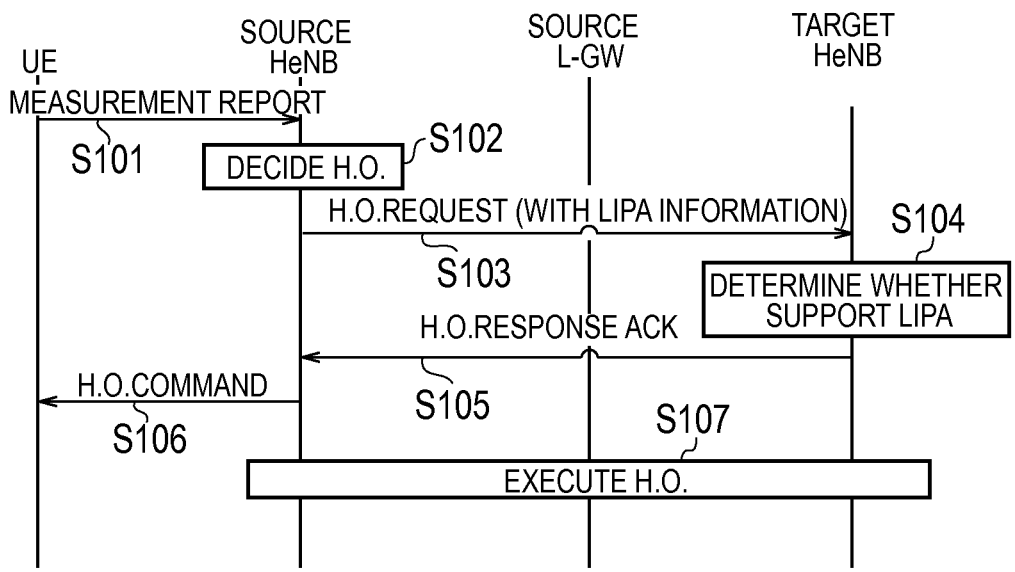
FIG. 5 is an operation sequence diagram of the mobile communication system when the target base station supports the LIPA.

FIG. 5 is a sequence diagram of the operation pattern 1 of the mobile communication system.

As shown in FIG. 5, in step S101, the radio communication unit 210 of the source HeNB 200-1 receives a measurement report from the UE 100. The measurement report includes a cell ID of the HeNB 200-2 and a measurement result of the cell.

In step S102, the HeNB function control unit 241 of the source HeNB 200-1 decides to start the handover procedure of the UE 100 to the target HeNB 200-2, on the basis of the cell ID of the target HeNB 200-2 included in the measurement report received from the UE 100 in step S101.

In step S103, the HeNB function control unit 241 of the source HeNB 200-1 controls the network communication unit 220 to include information (flag) indicating that the UE 100 has the LIPA connection in a handover request (H.O. Request) and transmit the handover request to the target HeNB 200-2. In this case, the handover request is transmitted on the X2 interface when the X2 interface is present between the source HeNB 200-1 and the target HeNB 200-2, and transmitted on the S1 interface when the X2 interface is not present. As a result of the handover request being transmitted, the preparation stage of the handover is started.

The network communication unit 220 of the target HeNB 200-2 receives the handover request from the source HeNB 200-1.

In step S104, the HeNB function control unit 241 of the target HeNB 200-2 confirms that the handover request received in step S103 includes the information indicating that the UE 100 has the LIPA connection, and confirms whether or not the target HeNB 200-2 (self station) supports the LIPA. In the present operation pattern, since the target HeNB 200-2 supports the LIPA, when another condition is also satisfied, it is determined that the HeNB function control unit 241 of the target HeNB 200-2 permits the handover request from the source HeNB 200-1.

In step S105, the HeNB function control unit 241 of the target HeNB 200-2 controls the network communication unit 220 to transmit the acknowledgement (H.O. Response ACK) to the handover request received in step S103 to the source HeNB 200-1. In this case, when the acknowledgement (H.O. Response ACK) is transmitted on the X2 interface when the X2 interface is present between the source HeNB 200-1 and the target HeNB 200-2, and transmitted on the S1 interface when the X2 interface is not present.

The network communication unit 220 of the source HeNB 200-1 receives the acknowledgement from the target HeNB 200-2.

In step S106, the HeNB function control unit 241 of the source HeNB 200-1 transmits a handover command to the UE 100 when the network communication unit 220 receives the acknowledgement from the target HeNB 200-2. As a result, the execution stage of the handover is started. The handover command includes information for the UE 100 to access the target HeNB 200-2.

The radio communication unit 110 of the UE 100 receives the handover command from the source HeNB 200-1. The control unit 140 of the UE 100 starts accessing the target HeNB 200-2 when the radio communication unit 110 receives the handover command from the source HeNB 200-1.

In step S107, the source HeNB 200-1 and the target HeNB 200-2 executes the execution stage and the completion stage of the handover. Upon completion of the handover procedure in this way, the UE 100 is capable of switching the serving cell (serving base station) to the target HeNB 200-2 in a state where the LIPA connection is maintained.

(2) Operation Pattern 2

Figure 6:
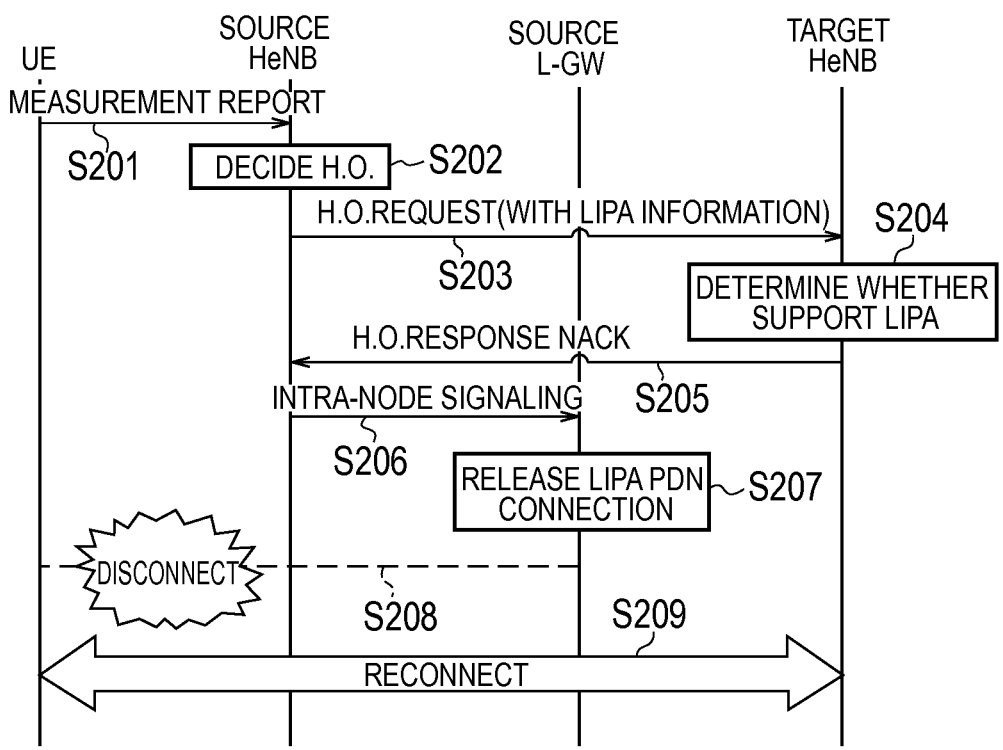
FIG. 6 is an operation sequence diagram of the mobile communication system when the target base station does not support the LIPA.

FIG. 6 is a sequence diagram of the operation pattern 2 of the mobile communication system.

As shown in FIG. 6, step S201 to step S203 are similar to step S101 to step S103 of the operation pattern 1.

The network communication unit 220 of the target HeNB 200-2 receives the handover request from the source HeNB 200-1.

In step S204, the HeNB function control unit 241 of the target HeNB 200-2 confirms that the handover request received in step S203 includes the information indicating that the UE 100 has the LIPA connection, and confirms whether or not the target HeNB 200-2 (self station) supports the LIPA. In the present operation pattern, since the target HeNB 200-2 does not support the LIPA, the HeNB function control unit 241 of the target HeNB 200-2 determines that the handover request from the source HeNB 200-1 is rejected.

In step S205, the HeNB function control unit 241 of the target HeNB 200-2 controls the network communication unit 220 to transmit the negative acknowledgement (H.O. Response NACK) to the handover request received in step S203 to the source HeNB 200-1. In this case, the negative acknowledgement (H.O. Response NACK) is transmitted on the X2 interface when the X2 interface is present between the source HeNB 200-1 and the target HeNB 200-2, and transmitted on the S1 interface when the X2 interface is not present.

The network communication unit 220 of the source HeNB 200-1 receives the negative acknowledgement from the target HeNB 200-2.

In step S206, the HeNB function control unit 241 of the source HeNB 200-1 cancels the handover procedure when the network communication unit 220 receives the negative acknowledgement from the target HeNB 200-2.

In step S206, the HeNB function control unit 241 of the source HeNB 200-1 uses Intra-node Signaling to request the L-GW function unit 242 of the source HeNB 200-1 to release the LIPA connection.

In step S207, the L-GW function unit 242 of the source HeNB 200-1 releases the LIPA connection of the UE 100 in response to the request from the HeNB function control unit 241 of the source HeNB 200-1.

In step S208, the HeNB function control unit 241 of the source HeNB 200-1 disconnects the connection between the source HeNB 200-1 and the UE 100.

In step S209, the control unit 140 of the UE 100 accesses the target HeNB 200-2 to perform reconnection with the LE 301.

(3) Specific Example of Handover Request

Next, by using Table 1, a specific example of a handover request according to the present embodiment will be described. Portions indicated by an underline in Table 1 are newly added information elements (IEs). Contents other than the positions indicated by the underline are the same as the contents defined in 9.1.1.1 HANDOVER REQUEST of 3GPP TS 36.423 V10.1.0.

TABLE 1

H.O. Request message

| IE/GROUP NAME | PRESENCE | RANGE | IE TYPE AND REFERENCE | SEMANTICS DESCRIPTION CRITICALITY | CRITICALITY | ASSIGNED CRITICALITY |
|---|---|---|---|---|---|---|
| MESSAGE TYPE | M | | 9.2.13 | | YES | REJECT |
| OLD eNB UE X2AP ID | M | | eNB UE X2AP ID 9.2.24 | ALLOCATED AT THE SOURCE eNB | YES | REJECT |
| CAUSE | M | | 9.2.6 | | YES | IGNORE |
| TARGET CELL ID | M | | ECGI 9.2.14 | | YES | REJECT |
| GUMMEI | M | | 9.2.16 | | YES | REJECT |
| UE CONTEXT INFORMATION | | 1 | | | YES | REJECT |
| >MME UE S1AP ID | M | | INTEGER $(0 \ldots 2^{32}-1)$ | MME UE S1AP ID ALLOCATED AT THE TIME | — | — |
| >UE SECURITY CAPABILITIES | M | | 9.2.29 | | — | — |
| >AS SECURITY INFORMATION | M | | 9.2.30 | | — | — |
| >UE AGGREGATE MAXIMUM BIT RATE | M | | 9.2.12 | | — | — |
| > SUBSCRIBER PROFILE ID FOR RAT/FREQUENCY PRIORITY | O | | 9.2.25 | | — | — |
| >E-RABS TO BE SETUP LIST | | 1 | | | — | — |
| >>E-RABS TO BE SETUP ITEM | | 1 to <maxnoof Bearers> | | | EACH | IGNORE |
| >>> E-RAB ID | M | | 9.2.23 | | — | — |
| >>> E-RAB LEVEL QoS PARAMETERS | M | | 9.2.9 | INCLUDES NECESSARY QoS PARAMETERS | — | — |
| >>> DL FORWARDING | O | | 9.2.5 | | — | — |
| >>> UL GTP TUNNEL ENDPOINT | M | | GTP TUNNEL ENDPOINT 9.2.1 | SGW ENDPOINT OF THE S1 TRANSPORT BEARER. FOR DELIVERY OF UL PDUS | — | — |

TABLE 1-continued

H.O. Request message

| IE/GROUP NAME | PRESENCE | RANGE | IE TYPE AND REFERENCE | SEMANTICS DESCRIPTION CRITICALITY | CRITICALITY | ASSIGNED CRITICALITY |
|---|---|---|---|---|---|---|
| >RRC CONTEXT | M | | OCTET STRING | INCLUDES THE RRC HANDOVER PREPARATION INFORMATION MESSAGE AS DEFINED IN SUBCLAUSE 10.2.2 OF TS 36.331 [9] | — | — |
| >HANDOVER RESTRICTION LIST | O | | 9.2.3 | | — | — |
| >LOCATION REPORTING INFORMATION | O | | 9.2.21 | INCLUDES THE NECESSARY PARAMETERS FOR LOCATION REPORTING | — | — |
| UE HISTORY INFORMATION | M | | 9.2.38 | SAME DEFINITION AS IN TS 36.413[4]. | YES | IGNORE |
| TRACE ACTIVATION | O | | 9.2.2 | | YES | IGNORE |
| SRVCC OPERATION POSSIBLE | O | | 9.2.33 | | YES | IGNORE |
| CSG MEMBERSHIP STATUS | O | | 9.2.52 | | YES | REJECT |
| LIPA CONNECTION STATUS | O | | | | | |

As shown in Table 1, the handover request according to the present embodiment includes an LIPA Connection Status IE indicating whether or not the UE 100 has the LIPA connection.

The LIPA Connection Status IE can be configured to be 1-bit flag such that when the UE 100 according to the handover request has the LIPA connection, the IE is "1" and when the UE 100 does not have the LIPA connection and has only normal connection, the IE is "0".

Effect of the Embodiment

As described above, the source HeNB 200-1 that supports the LIPA includes the information indicating that the UE 100 has the LIPA connection in the handover request and transmits the handover request to the target base station when the handover procedure of the UE 100 having the LIPA connection is started from the source HeNB 200-1 to the target base station.

Then, the source HeNB 200-1 continues the handover procedure without releasing the LIPA connection when the target base station permits the handover request.

As a result, even when not recognizing previously whether or not the LIPA is supported by the target station, the source HeNB 200-1 confirms, on the target base station side, whether or not the LIPA is supported, thereby making it possible to perform handover while maintaining the LIPA connection.

Other Embodiment

As described above, the present invention was described according to the embodiment. However, it must not be understood that the discussions and drawings constituting a part of this disclosure limit the present invention. From this disclosure, various alternative embodiments, examples and operational techniques are apparent to those skilled in the art.

An access type such as "closed" in which only an access by a specific UE is permitted and "open" in which an access by another UE also is permitted, may be set to the HeNB. In the above-described embodiment, such an access type is not particularly taken into consideration; however, the handover control may be performed in further consideration of the access type. For example, the target HeNB that has received the information indicating that the UE 100 has the LIPA connection may transmit the acknowledgement to the handover request, to the source HeNB, in a case of an access type in which the target HeNB supports the LIPA and the target HeNB permits the access by the UE.

In the above-described embodiment, a case is assumed that the target HeNB and the source HeNB are located within the same house (or company); however, whether or not the target HeNB is in the house (or company) where the source HeNB is located may be considered at the time of handover determination. For example, the target HeNB that has received the information indicating that the UE 100 has the LIPA connection may transmit the acknowledgement to the handover request, to the source HeNB when the target HeNB supports the LIPA and is in the same house (or company) where the source HeNB is.

Figure 7:
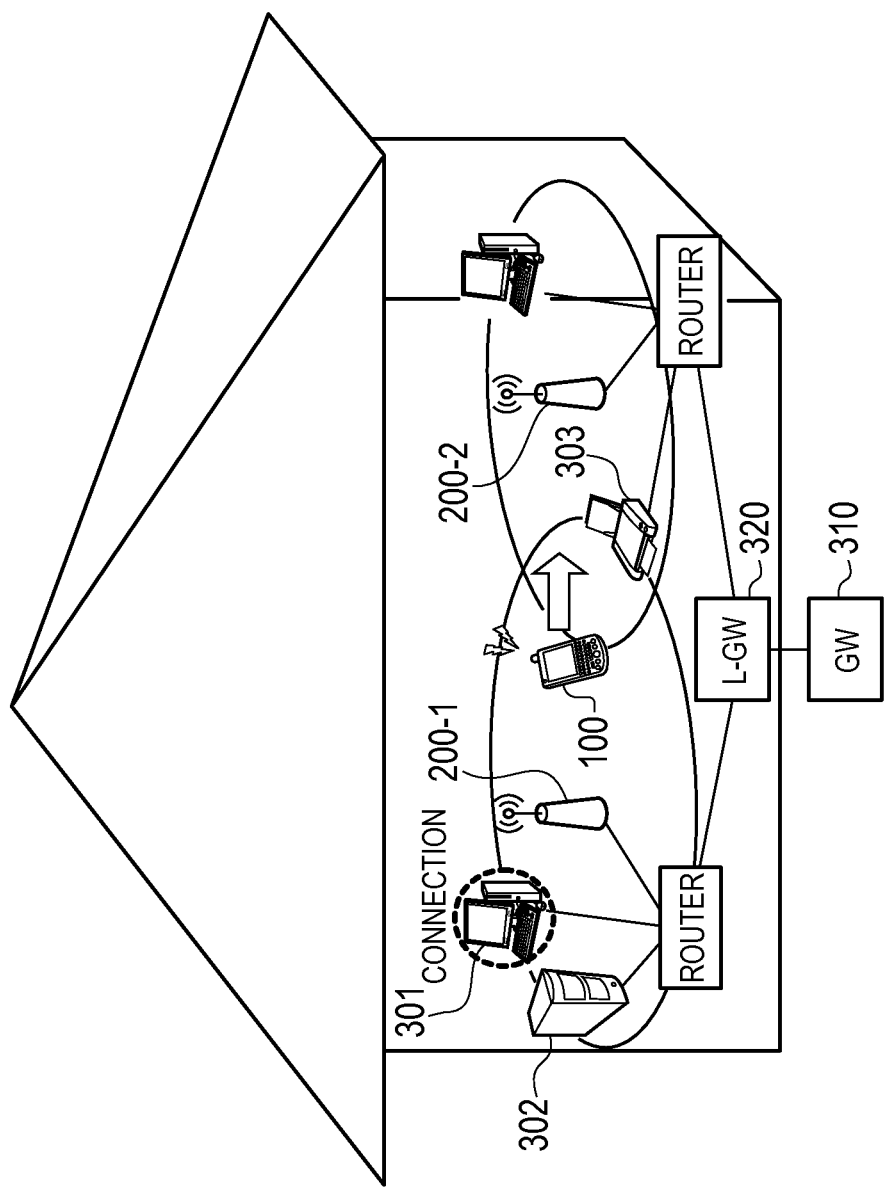
FIG. 7 is a configuration diagram of the mobile communication system according to the other embodiment.

In the above-described embodiment, the configuration that the L-GW function is provided inside the HeNB has been described; however, it may be configured such that the L-GW, as an external node, is provided independently of the HeNB. For example, as shown in FIG. 7, it may be configured such that one L-GW 320 is provided for the plurality of HeNBs 200-1 and 200-2 in a home (or within a company). In such a configuration, in releasing the LIPA connection, the HeNB 200-1 requests the L-GW 320 to release the LIPA connection by using an interface between the HeNB 200-1 and the L-GW 320 instead of using Intra-node Signaling.

Figure 8:
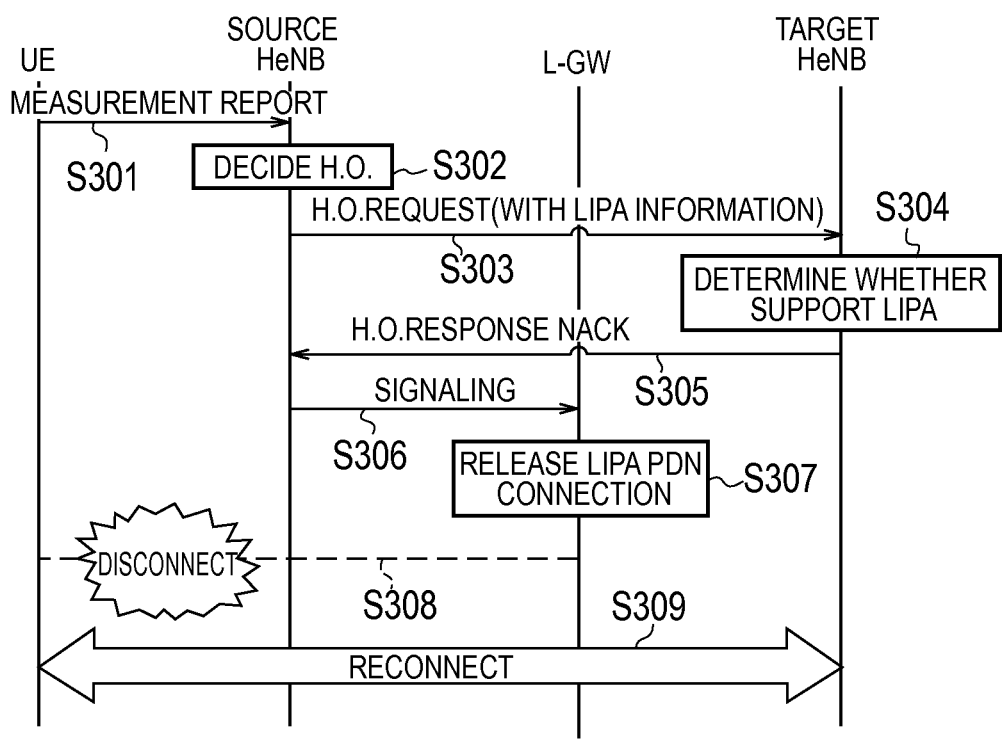
FIG. 8 is an operation sequence diagram of the mobile communication system according to the other embodiment.

FIG. 8 is an operation flowchart in a configuration example shown in FIG. 7. In this case, description will be given for an operation of the mobile communication system when the HeNB 200-1 that supports the LIPA is a source and the HeNB 200-2 that does not support the LIPA is a target. In addition, differences from FIG. 6 will be mainly described.

As shown in FIG. 8, step S301 to step S305 are executed similarly to those in FIG. 6.

In step S306, the source HeNB 200-1 cancels the handover procedure when the negative acknowledgement from the target HeNB 200-2 is received. Then, the source HeNB 200-1 uses the interface between the HeNB 200-1 and the L-GW 320 and requests the L-GW 320 to release the LIPA connection.

In step S307, the L-GW 320 releases the LIPA connection of the UE 100 in response to the request from the source HeNB 200-1.

In step S308, the source HeNB 200-1 disconnects the connection between the source HeNB 200-1 and the UE 100.

In step S309, the UE 100 accesses the target HeNB 200-2 to perform reconnection with the LE 301.

As described above, it must be understood that the present invention includes various embodiments or the like that are not described herein.

INDUSTRIAL APPLICABILITY

As described above, a communication control method and a home base station according to the present invention are useful in a mobile communication system, with which it is possible to support a mobility of an LIPA connection.

The invention claimed is:

1. A communication control method in a source home base station that supports LIPA (Local Internet Protocol Access) defined in the 3GPP (3rd Generation Partnership Project) standards, comprising:
   a step of transmitting information indicating that a user terminal has an LIPA connection in a handover request, from the source home base station to a target base station, by including the information in the handover request, when a handover procedure from the source home base station to the target base station is started for the user terminal having the LIPA connection;
   a step of continuing the handover procedure without releasing the LIPA connection when the target base station supports the LIPA; and
   a step of canceling the handover procedure when the target base station does not support the LIPA.

2. A source home base station that supports LIPA (Local Internet Protocol Access) defined in the 3GPP (3rd Generation Partnership Project) standards, comprising:
   a transmitter configured to transmit information indicating that a user terminal has an LIPA connection, to a target base station, by including the information in a handover request, when a handover procedure from the source home base station to the target base station is started for the user terminal having the LIPA connection; and
   a control unit including a processor configured to continue the handover procedure without releasing the LIPA connection when the target base station supports the LIPA, and
   cancel the handover procedure when the target base station does not support the LIPA.

3. A communication control method in a target home base station, comprising:
   a step of receiving, at the target home base station, a handover request transmitted from a source home base station that supports LIPA (Local Internet Protocol Access) defined in the 3GPP (3rd Generation Partnership Project) standards, the handover request including information indicating that a user terminal has an LIPA connection;
   a step of permitting, by the target home base station, the handover request from the source home base station only when the target home base station supports the LIPA; and
   a step of rejecting, by the target home base station, the handover request from the source home base station when the target home base station does not support the LIPA.

4. A target home base station comprising:
   a receiver configured to receive a handover request transmitted from a source home base station that supports LIPA (Local Internet Protocol Access) defined in the 3GPP (3rd Generation Partnership Project) standards, the handover request including information indicating that a user terminal has an LIPA connection; and
   a control unit including a processor configured to permit the handover request from the source home base station only when the target home base station supports the LIPA, and
   reject the handover request from the source home base station when the target home base station does not support the LIPA.

\* \* \* \* \*